(12) United States Patent
Nam

(10) Patent No.: US 8,780,819 B2
(45) Date of Patent: Jul. 15, 2014

(54) METHOD AND SYSTEM FOR CONTROLLING WIRELESS COMMUNICATION CHANNEL

(75) Inventor: Seung Hoon Nam, Suwon-si (KR)

(73) Assignee: Samsung Electronics, Co., Ltd, Suwon-Si (KR)

( * ) Notice: Subject to any disclaimer, the term of this patent is extended or adjusted under 35 U.S.C. 154(b) by 565 days.

(21) Appl. No.: 12/657,056

(22) Filed: Jan. 12, 2010

(65) Prior Publication Data

US 2010/0177639 A1     Jul. 15, 2010

(30) Foreign Application Priority Data

Jan. 12, 2009   (KR) .................. 10-2009-0002397

(51) Int. Cl.
*H04W 4/00*     (2009.01)
*H04W 72/00*    (2009.01)

(52) U.S. Cl.
USPC ........ 370/329; 370/332; 455/464; 455/452.1; 455/452.2

(58) Field of Classification Search
USPC ......... 370/237, 329, 333, 332; 455/62, 452.2, 455/436, 452.1, 464
See application file for complete search history.

(56) References Cited

U.S. PATENT DOCUMENTS

| 5,963,848 | A * | 10/1999 | D'Avello ................. 455/62 |
| 6,628,639 | B1 * | 9/2003 | Ishii ....................... 370/346 |
| 7,171,160 | B2 * | 1/2007 | Chuah et al. ............ 455/62 |
| 8,045,993 | B2 * | 10/2011 | Chu et al. ............ 455/452.2 |
| 2004/0156336 | A1 * | 8/2004 | McFarland et al. ...... 370/329 |
| 2005/0153667 | A1 * | 7/2005 | Cave et al. ............ 455/90.3 |
| 2006/0029023 | A1 * | 2/2006 | Cervello et al. ........ 370/333 |
| 2006/0264227 | A1 * | 11/2006 | Takahashi et al. ...... 455/513 |
| 2008/0064404 | A1 * | 3/2008 | Zhang et al. .......... 455/436 |
| 2008/0207215 | A1 * | 8/2008 | Chu et al. ............ 455/452.2 |

FOREIGN PATENT DOCUMENTS

| KR | 1020050073430 | 7/2005 |
| KR | 1020060029046 | 4/2006 |

* cited by examiner

Primary Examiner — Awet Haile

(57) ABSTRACT

A portable terminal is capable of controlling a wireless communication channel control. If a particular wireless communication channel established between the portable terminal and access points (APs) is congested, the portable terminal is switched to one of the channels used by APs whose number is less than the number of APs using the particular wireless communication channel.

20 Claims, 5 Drawing Sheets

METHOD AND SYSTEM FOR CONTROLLING WIRELESS COMMUNICATION CHANNEL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 12, 2009 and assigned Serial No. 10-2009-0002397, the entire disclosure of which is hereby incorporated by reference

TECHNICAL FIELD OF THE INVENTION

The present invention relates to wireless communication systems, and more particularly, to a wireless communication channel control method and system that can switch a wireless communication channel, established between a portable terminal and an access point (AP), to a channel used by a relatively small number of access points (APs) if the wireless communication channel is congested.

BACKGROUND OF THE INVENTION

Recently, wireless local area network (WLAN) protocols whose wireless coverage range is short have been developed considering the mobility. Examples of the WLAN protocols are Wi-Fi, Bluetooth, ZigBee, and the like. WLAN protocols define a variety of technical standards to connect systems to a wired network via access points (APs). WLAN protocols include 802.11b and 802.11g protocols, which uses 2.4 GHz frequency band, and 802.11a protocol that uses 5 GHz frequency band. WLAN protocols allow for communication using a plurality of channels. For example, 802.11b and 802.11g protocols each include 14 channels that are spaced 5 MHz apart except for a 12 MHz spacing before last channel, that is, Channel 14. However, the 802.11b and 802.11g protocols each require 25 MHz of channel separation, adjacent channels overlap and will interfere with each other.

With the development of communication technology, portable terminals supporting WLAN protocols, such as Wi-Fi, and the like, are increasing. These portable terminals can wirelessly establish communication channels with APs and provide Internet services through the APs. The portable terminals supporting a Wi-Fi protocol are configured to establish a fixed wireless communication channel with APs. That is, the conventional portable terminals establish a wireless communication channel with a particular AP, using a preset channel, and do not change the channel. Therefore, if a plurality of APs use the same channel or adjacent channels, the wireless communication channel between the portable terminal and the AP may be congested due to frequency interference. That is, if a plurality of APs, located close to a portable terminal, use the same channel or adjacent channels, the portable terminal experiences the decrease of the communication speed and the disconnection of the communication channel.

SUMMARY OF THE INVENTION

To address the above-discussed deficiencies of the prior art, it is a primary object to provide a wireless communication channel control method and system that can check whether a wireless communication channel, established between a portable terminal and an access point (AP), is congested and switch the wireless communication channel to a channel where a congestion has not occurred, that is, which is used by a relatively small number of access points (APs) if the wireless communication channel is congested.

In accordance with an exemplary embodiment of the present invention, the present invention provides a method for controlling wireless communication channels including: establishing a wireless communication channel via a particular channel set to an access point (AP), where the wireless communication channel is one of a plurality of channels that may be established between a portable terminal and the AP; checking whether the particular channel is congested; identifying, if the particular channel is congested, information regarding channels used by a plurality of APs located in a range of communication of the portable terminal, and comparing the number of APs by channels; and switching the wireless communication channel to one of the mobile channels that serve as channels used by APs whose number is less than the number of APs using the particular channel.

In accordance with another exemplary embodiment of the present invention, the present invention provides a system for controlling wireless communication channels, including: a plurality of access points (APs); and a portable terminal that can establish a wireless communication channel with one selected from among the plurality of APs via a particular channel set to the selected AP and for switching, if the wireless communication channel established via the particular channel is congested, the wireless communication channel to one of the mobile channels that serve as channels used by APs whose number is less than the number of APs using the particular channel.

In accordance with another exemplary embodiment of the present invention, the present invention provides a portable terminal capable of controlling wireless communication channels, the portable terminal comprising: a wireless local area network (WLAN) communication unit configured to communicate an RF signal with the selected AP; and a controller configured to communicate with a plurality of access points (APs), to establish a wireless communication channel with a selected AP from among the plurality of APs via a particular channel set to the selected AP, to switch, if the wireless communication channel established via the particular channel is congested, the wireless communication channel to one of the mobile channels that serve as channels used by APs whose number is less than the number of APs using the particular channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
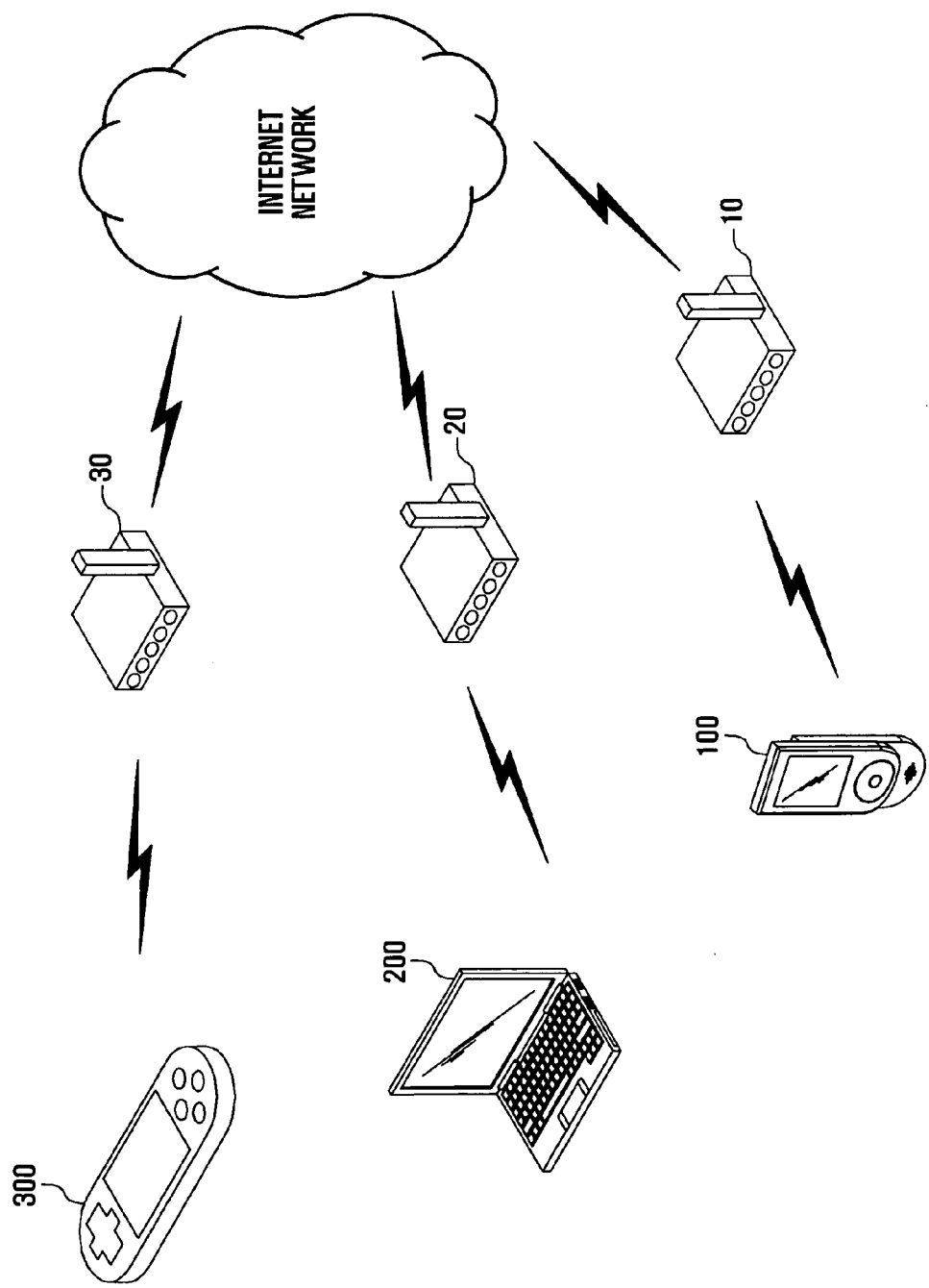
FIG. 1 illustrates a configuration of a system for controlling a wireless communication channel, according to an embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Prior to explaining the embodiments of the present invention, terminologies will be defined for the present description below. The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

The term 'packet error rate (PER)' refers to the ratio of the number of retransmitted packets to the total number of received packets for a certain time period.

The term 'retransmission rate (RR)' refers to the ratio of the number of retransmitted packets to the total number of transmitted packets for a certain time period.

The term 'congestion' refers to a state where at least one of the PER and the RR is equal to or greater than a preset threshold. In an embodiment of the present invention, it is assumed that congestion occurs in a wireless communication channel used by a relatively large number of APs.

The term 'mobile channels' refer to channels used by APs whose number is less than the number of APs that use a particular channel having established a communication channel, where the channels are portion of a plurality of channels may be established between a portable terminal and an AP.

FIG. 1 illustrates a configuration of a system for controlling a wireless communication channel, according to an embodiment of the present invention.

A wireless communication network system may include a plurality of wireless communication devices 100, 200, and 300, and a plurality of access points (APs) 10, 20, and 30. The wireless communication network system uses WLAN protocols, for example, a Wi-Fi protocol. In an embodiment of the present invention, the wireless communication channel control system will be explained, referring to the portable terminal 100 and the first AP 10. Although FIG. 1 shows three APs and three wireless communication devices, respectively, it should be understood that the present invention is not limited to the embodiment. For example, the wireless communication network system according to the present invention may be implemented with at least one or more wireless communication devices and APs.

The portable terminal 100 refers to a terminal that can perform Wi-Fi communication and can establish a wireless communication channel with one of the plurality of APs 10, 20 and 30. In the following description, embodiments of the present invention will be explained under the assumption that the portable terminal 100 establishes a wireless communication channel with the first AP 10. In order to establish a wireless communication channel, the portable terminal 100 may transmit a probe request message with respect to a plurality of channels. That is, the portable terminal 100 scans frequencies to seek a connectable AP. The APs 10, 20, and 30 receives the probe request message and transmit a probe response message to the portable terminal 100. The probe response message contains a service set identifier (SSID) of an AP and information regarding a channel set and stored in an AP which is hereinafter called a particular channel. The portable terminal 100 receives the probe response messages and displays the SSID of each of the APs. Thereafter, if one of the SSIDs, for example, an SSID corresponding to the first AP 10, is selected, the portable terminal 100 establishes a wireless communication channel with the first AP 10, using a channel set in the first AP 10, that is, a particular channel. Alternatively, if the portable terminal 100 has already stored information regarding the first AP 10 with which the portable terminal 100 intends to establish a wireless communication channel, the portable terminal 100 can directly transmit an associate request message to the first AP 10. In particular, if the particular channel is congested, the portable terminal 100 may perform a switching operation with respect to the wireless communication channel. For example, if frequency interference and traffic increase due to the increase of the number of APs using the particular channel, that is, the second and third APs 20 and 30 establish wireless communication channels with other portable terminals using the particular channel set in the first AP 10, the particular channel may be congested. The portable terminal 100 may identify information regarding channels used by a plurality of APs existing within a certain range of communication in order to switch a wireless communication channel. Thereafter, the portable terminal 100 estimates the number of APs for each channel, which means the number of APs using each channel, and then switches the wireless communication channel to one of the mobile channels, where the mobile channels are channels used by APs whose number is less than the number of APs that use the particular channel. The channel switching operation will be explained later.

The first AP 10 refers to a device that establishes a wireless communication channel with the portable terminal 100 and allows the portable terminal 100 to access a wired network, for example, the Internet. The first AP 10 may store a particular channel, such as, channel 6, to establish a wireless communication channel with the portable terminal 100. The particular channel stored in the first AP 10 may be changed according to a user's operation. In particular, if the first AP 10 receives a channel switch message from the portable terminal 100, the first AP 10 can switch the particular channel to one of the mobile channels according to the received message. More specifically, if the portable terminal 100 ascertains that the particular channel is congested, the portable terminal 100 may transmit a channel switch message, requesting to switch the particular channel to one selected from among the mobile channels, to the first AP 10. The channel switch message contains an Internet protocol (IP) address of the first AP 10 and information regarding one selected from among the mobile channels. The first AP 10 receives the channel switch message and then switches the wireless communication channel to the selected channel. If the portable terminal 100 needs to reestablish a communication channel released by the channel switching operation of the first AP 10, the portable terminal 100 may transmit an associate request message to the first AP 10 via the selected channel. The first AP 10 transmits a response message, replying to the associate request message, to the portable terminal 100, thereby completing the channel switching operation. It is preferable that the channel switch operation be performed within a few milliseconds so that users cannot recognize disconnection of a communication channel.

In the foregoing description, the wireless communication channel control system has been explained. A detailed description is provided regarding the configuration of a portable terminal according to an embodiment of the present invention with reference to FIG. 2.

Figure 2:
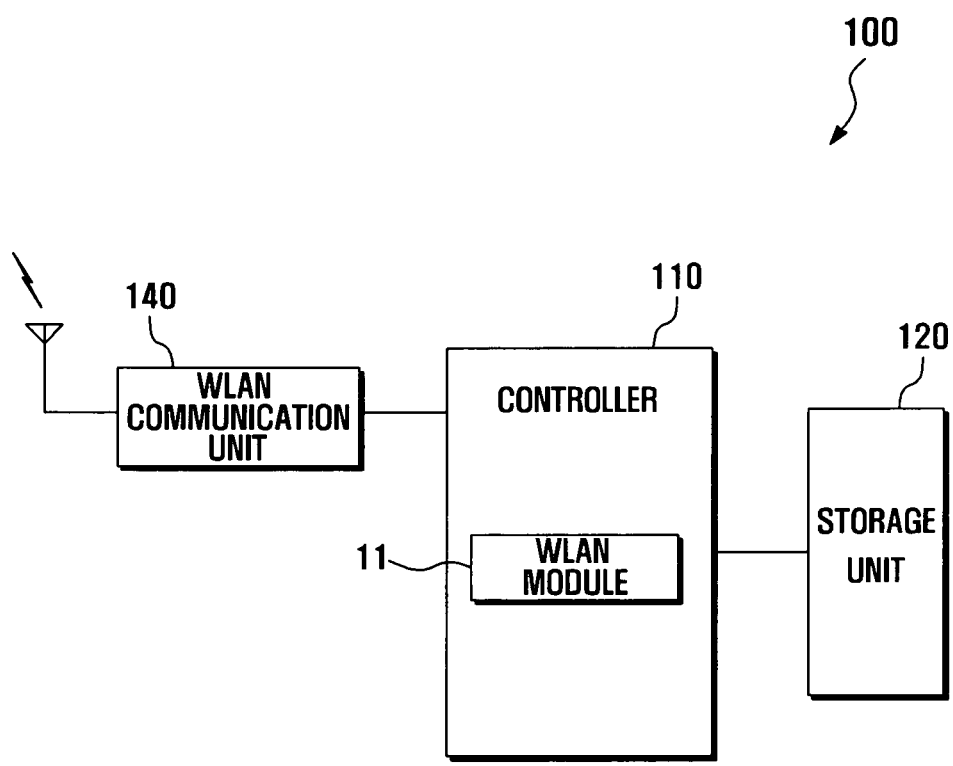
FIG. 2 illustrates a portable terminal according to an embodiment of the present invention.

FIG. 2 illustrates a portable terminal 100 according to an embodiment of the present invention.

Referring to FIGS. 1 and 2, the portable terminal 100 includes a controller 110, a storage unit 120, and a wireless local area network (WLAN) communication unit 140.

The WLAN communication unit 140 performs wireless communication with the first AP 10 located in a WLAN service area. The WLAN communication unit 140 may include an RF transmitter and an RF receiver. The RF transmitter up-coverts the frequency of signals that will be transmitted and amplifies the signals. The RF receiver low-noise amplifies received RF signals and down-coverts the frequency of the received RF signals. If a particular channel is congested, the WLAN communication unit 140 transmits a channel switch message to the first AP 10 under the control of the controller 110. The WLAN communication unit 140 transmits a probe request message to a plurality of APs located within a range of communication in order to calculate the number of APs for each channel, and receives probe response messages therefrom, under the control of the controller 110. The WLAN communication unit 140 transmits an associate request message to the first AP 10 to establish a wireless communication channel, and receives a response message thereto from first AP 10, under the control of the controller 110.

The storage unit 120 stores a program for controlling the entire operation of the portable terminal 100 as well as an operating system (OS) for booting the portable terminal 100. The storage unit 120 may also store application programs required to play-back multimedia contents. The storage unit 120 can store data generated when the portable terminal 100 is operated. In an embodiment of the present invention, the storage unit 120 stores a program for identifying whether a particular channel is congested and switching the particular channel to the other channel. The storage unit 120 stores a reference value for identifying channels environments of the first AP 10 and the portable terminal 100, and first and second thresholds for determining whether the particular channel is congested. It is preferable that the second threshold is greater than the first threshold.

The storage unit 120 may also store the following table 1 to identify the mobile channels and to calculate the number of APs for each channel.

TABLE 1

| Channels | No. of APs |
|---|---|
| 1 | 3 |
| 2 | 4 |
| 3 | 2 |
| 4 | 0 |
| 5 | 2 |
| 6 | 5 |
| 7 | 5 |
| 8 | 7 |
| 9 | 0 |
| 10 | 8 |
| 11 | 3 |
| 12 | 5 |
| 13 | 6 |
| 14 | 0 |

Table 1 shows the number of APs for each channel, based on a Wi-Fi communication channel in 2.4 GHz band.

Referring to Table 1, if a wireless communication channel between the first AP 10 and the portable terminal 100 is established via Channel 6, the mobile channels may be Channels 1 to 5, 9, 11, and 14. Thereafter, the controller 110 may switch the wireless communication channel to one of the mobile channels. A method for selecting one from among the mobile channels will be described later. In an embodiment of the present invention, although the mobile channels have been explained in such a way that they are used by APs whose number is less than the number of APs using the particular channel, it should be understood that the present invention is not limited to the embodiment. For example, the mobile channels may be set as a channel used by APs whose number is at least two less than the number of APs using the particular channel. if the mobile channel is set a channel, such as Channel 2, used by APs whose number is one less than the number of APs using the particular channel, the channel switching effect is not large because the channel switching operation is performed and then the number of APs of Channel 2 is the same as the number of APs of a previous particular channel.

The controller 110 controls the entire operation of the portable terminal 100 and signal flows among elements in the portable terminal 100. The controller 110 can also control the data process function. In an embodiment of the present invention, the controller 110 establishes a wireless communication channel with the first AP 10 using the particular channel and checks whether the particular channel is congested. As such, the controller 110 may further include a WLAN module 11.

The WLAN module 11 controls the WLAN communication unit 140 to perform wireless communication. In an embodiment of the present invention, the WLAN module 11 continues monitoring the PER and RR and outputs them to the controller 110.

The controller 110 receives the PER and RR, and checks whether the particular channel is congested referring to first and second thresholds stored in the storage unit 120. In an embodiment of the present invention, the congestion determining conditions may be differently set according to the channel environment between the first AP 10 and the portable terminal 100. For example, the controller 110 measures the received signal strength indication (RSSI) to check the channel environment. In a case where the RSSI is equal to and greater than a preset reference value, that is, a transmission and reception state is proper, if at least one of the PER and RR is equal to or greater than the first threshold, the controller 110 concludes that the particular channel is congested. Conversely, in a case where the RSSI is less than a preset reference value, that is, a transmission and reception state is insufficient, if at least one of the PER and RR is equal to or greater than the second threshold that is greater than the first threshold, the controller 110 concludes that the current channel is congested. Alternatively, the controller 110 calculates the frequency that at least one of the PER and RR is equal to or greater than the first threshold for a preset period and concludes that the particular channel is congested if the calculated frequency is equal to or greater than a preset value. If the controller 110 ascertains that the particular channel is congested, the controller 110 transmits a probe request message to a plurality of APs located within a range of communication of the WLAN communication unit 140 and then receives probe response messages there from. Transmission of the probe request message may be performed with respect to each of the plurality channels that may be established between the portable terminal 100 and the first AP 10.

Thereafter, the controller 110 identifies the probe response messages and calculates the number of APs by channels. The controller 110 compares the number of APs by channels and then switches a wireless communication channel to one of the mobile channels, where the mobile channels refer to channels used by APs whose number is less than the number of APs using the particular channel. The controller 110 may switch the wireless communication channel to one of the mobile channels, used by the least number of APs. If the least number of APs uses a number of channels, the controller 110 switches the wireless communication channel to a channel that is spaced apart from the particular channel with the largest frequency difference. For example, as described in table 1, if Channels 4, 9, and 14 are used by the least number of APs and the particular channel is Channel 6, the controller 110 may switch the wireless communication channel to Channel 14 that is spaced apart there from with the largest frequency difference.

The controller 110 may calculate the summation of the number of APs of channels adjacent to the mobile channels, and switch the wireless communication channel to the mobile channel having the smallest summation. This channel switching operation is performed because of the following reason. That is, if a number of APs use a channel adjacent to the mobile channels used by the least number of APs, the frequency of the adjacent channel causes the congestion in the wireless communication channel established between the portable terminal 100 and the first AP 10. For example, as described in table 1, regarding a case where a wireless communication channel is switched to Channel 9, Channel 9 is used by no AP but Channels 8 and 10 adjacent to Channel 9 are used by a plurality of APs, so that Channel 9 may be congested by the frequency interference due to Channels 8 and 10. Therefore, it is not preferable that a wireless communication channel be switched to Channel 9.

The controller 110 may generate a channel switch message and transmit it to the first AP 10. The first AP 10 receives the channel switch message and performs a channel switching operation. The controller 110 transmits an associate request message to the first AP 10, and receives a response message thereto to reestablish a wireless communication channel that was released by the channel switching operation of the first AP 10. It is preferable that the channel switching operation be performed within a few milliseconds so that a user cannot recognize the disconnection of a communication channel.

Although it is not shown in FIGS. 1 and 2, the portable terminal 100 may further includes a camera module for capturing images or moving images, a broadcast receiver module for receiving broadcasts, an audio signal outputting device such as a speaker, an audio signal inputting device such as a microphone, a digital audio source reproducing module such as an MP3 player module, and the like. With the convergence of digital devices, there may be many digital devices and modifications thereof, not listed in the application, and, it will be appreciated that they can also be included in the portable terminal.

Figure 3:
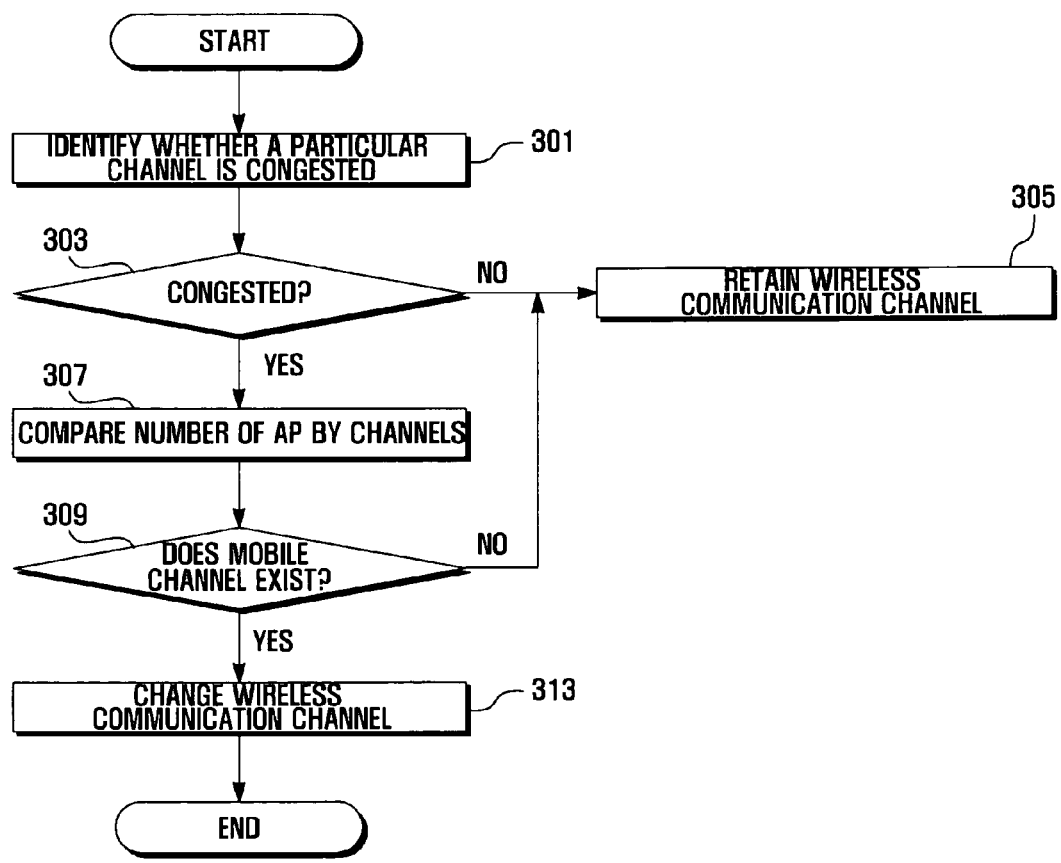
FIG. 3 illustrates a flow chart that describes a method for controlling a wireless communication channel according to an embodiment of the present invention.

FIG. 3 illustrates a flow chart that describes a method for controlling a wireless communication channel according to an embodiment of the present invention.

The wireless communication channel control method according to the present invention will be explained, based on a wireless communication channel established via a particular channel that is set to the first AP 10 and one of a plurality of channels that may be established between the portable terminal 100 and the first AP 10.

Referring to FIGS. 1 to 3, the controller 110 identifies and determines whether the particular channel established with the first AP 10 is congested in blocks 301 and 303. A determination regarding the channel congestion is made whether the PER or RR is equal to or greater than a preset reference value, which will be described herein below with respect to FIG. 4.

When the controller 110 ascertains that the particular channel is not congested at block 303, the controller 110 retains a wireless communication channel via the particular channel in block 305. Alternatively, if the controller 110 ascertains that the particular channel is congested at block 303, the controller 110 identifies information regarding channels used by a plurality of APs 10, 20, and 30 existing within a range of communication of the portable terminal 100 and compares the number of APs by channels in block 307, which will be described later referring to FIG. 5.

Thereafter, the controller 110 determines whether there are mobile channels that serve as channels used by APs whose number is less than the number of APs using the particular channel in block 309. If the controller 110 ascertains that there are not mobile channels at block 309, the controller 110 returns to and proceeds with block 305 and retains a wireless communication channel. Alternatively, if the controller 110 ascertains that there are mobile channels at block 309, the controller 110 switches the wireless communication channel to one of the mobile channels in block 313. The controller 110 generates a channel switch message for switching a wireless communication channel and transmits it to the first AP 10. The channel switch message is a format of hyper text transfer protocol (HTTP) and contains an IP address of the first AP 10 and information regarding one selected from among the mobile channels. The first AP 10 receives the channel switch message and switches the wireless communication channel to the selected mobile channel. Thereafter, the controller 110 transmits an associate request message to the first AP 10 via the selected channel, and receives a response message thereto from the first AP 10, thereby completing the channel switching operation with respect to the wireless communication channel. It is preferable that the channel switch operation be performed within a few milliseconds so that users cannot recognize disconnection of a communication channel.

Therefore, the wireless communication channel control method according to the present invention performs wireless communication via a channel used by the least number of APs, thereby preventing the traffic increase, the data loss, and the reduction of communication speed, due to frequency interference.

In the foregoing description, the wireless communication channel control method has been explained. A detailed description is explained regarding a method for identifying whether a particular channel is congested referring to FIG. 4.

Figure 4:
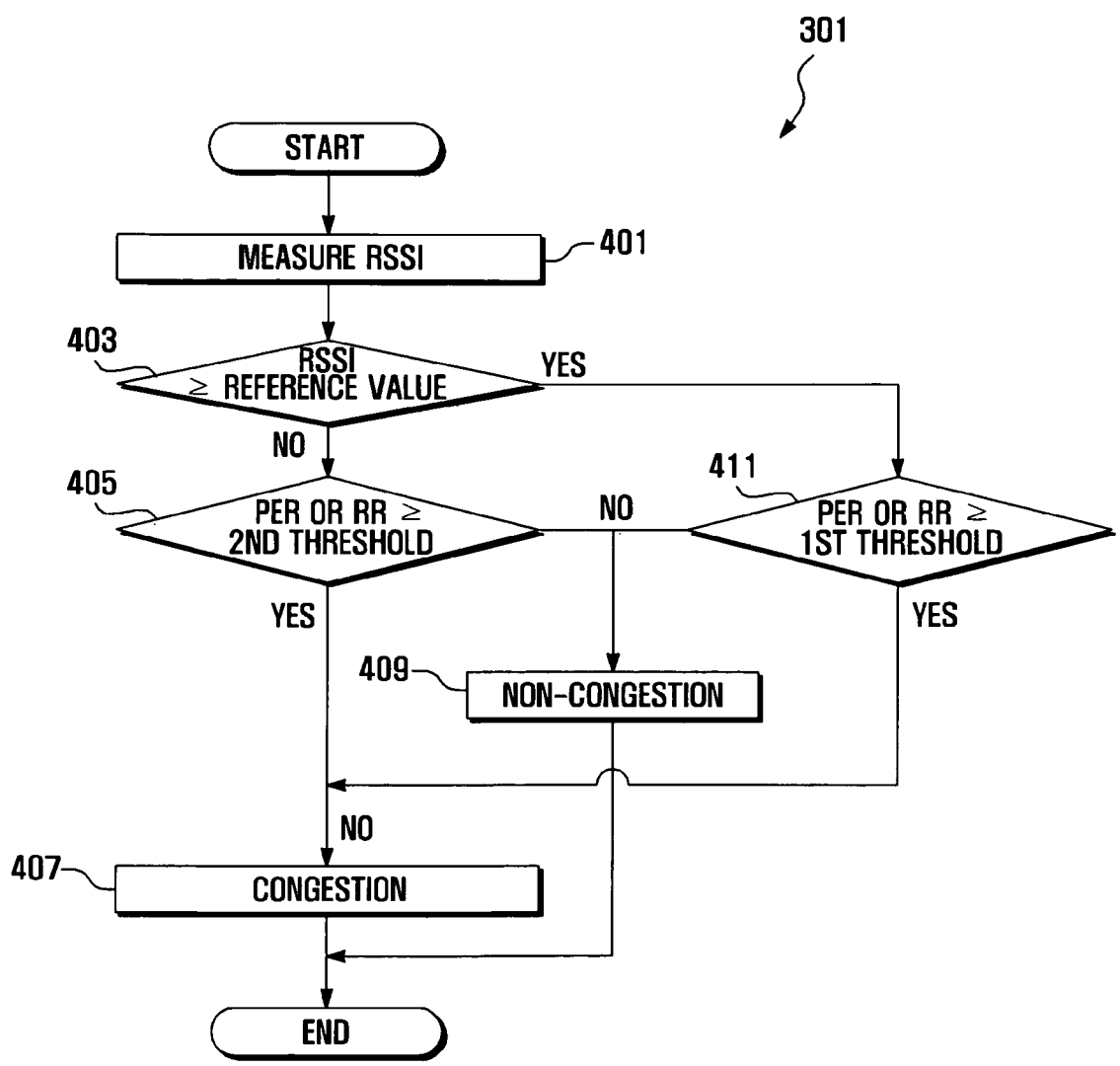
FIG. 4 illustrates a flow chart that describes a method for identifying whether a particular channel is congested according to an embodiment of the present invention.

FIG. 4 illustrates a flow chart that describes a method for identifying whether a particular channel is congested, according to an embodiment of the present invention.

Referring to FIGS. 1 to 4, the controller 110 measures the received signal strength indication (RSSI) in block 401. Thereafter, the controller 110 checks whether the RSSI is equal to or greater than a preset reference value in block 403. This is to identify a transmission/reception state between the portable terminal 100 and the first AP 10 and to determine whether the particular channel is congested.

If the controller 110 ascertains that the RSSI is equal to or greater than a preset reference value, that is, a transmission/reception state is proper, at block 403, it determines whether at least one of the PER and RR, from the WLAN module 11, is equal to or greater than a first threshold in block 411. If the controller 110 ascertains that at least one of the PER and RR is equal to or greater than a first threshold at block 411, the controller 110 concludes that the particular channel is congested in block 407. Alternatively, if the controller 110 ascertains that at least one of the PER and RR is less than a first threshold at block 411, it concludes that the particular channel is not congested in block 409. In that case, the controller 110 retains a wireless communication channel via the particular channel.

Meanwhile, if the controller 110 ascertains that the RSSI is less than a preset reference value, that is, a transmission/reception state is insufficient, at block 403, the controller 110 determines whether at least one of the PER or RR is equal to or greater than a second threshold that is greater than the first threshold in block 405. If the controller 110 ascertains that at least one of the PER or RR is equal to or greater than a second threshold at block 405, it concludes that the particular channel is congested at block 407. Alternatively, if the controller 110 ascertains that at least one of the PER or RR is less than the second threshold at block 405, the controller 110 concludes that the particular channel is not congested at 409. In that case, the controller 110 retains a wireless communication channel via the particular channel.

In an embodiment of the present invention, if the RSSI is less than the reference value, although a determination whether the particular channel is congested is made by identifying whether the PER or RR is equal to or greater than the second threshold, it should be understood that the present invention is not limited to the embodiment. That is, the embodiment may be modified in such a way to calculate the frequency that at least one of the PER and RR is equal to or greater than the first threshold for a preset period, and conclude that the particular channel is congested if the calculated frequency is equal to or greater than a preset value.

In an embodiment of the present invention, although the congestion determination condition is differently set according to the channel environment between the portable terminal 100 and the first AP 10, that is, the transmission/reception state, it should be understood that the present invention is not limited to the embodiment. That is, the embodiment may be modified in such a way to apply the same congestion determination condition to the system without discerning the channel environments.

In the foregoing description, the method for identifying whether the particular channel is congested has been explained. A detailed description is explained regarding a method for comparing the numbers of APs by channels with reference to FIG. 5.

Figure 5:
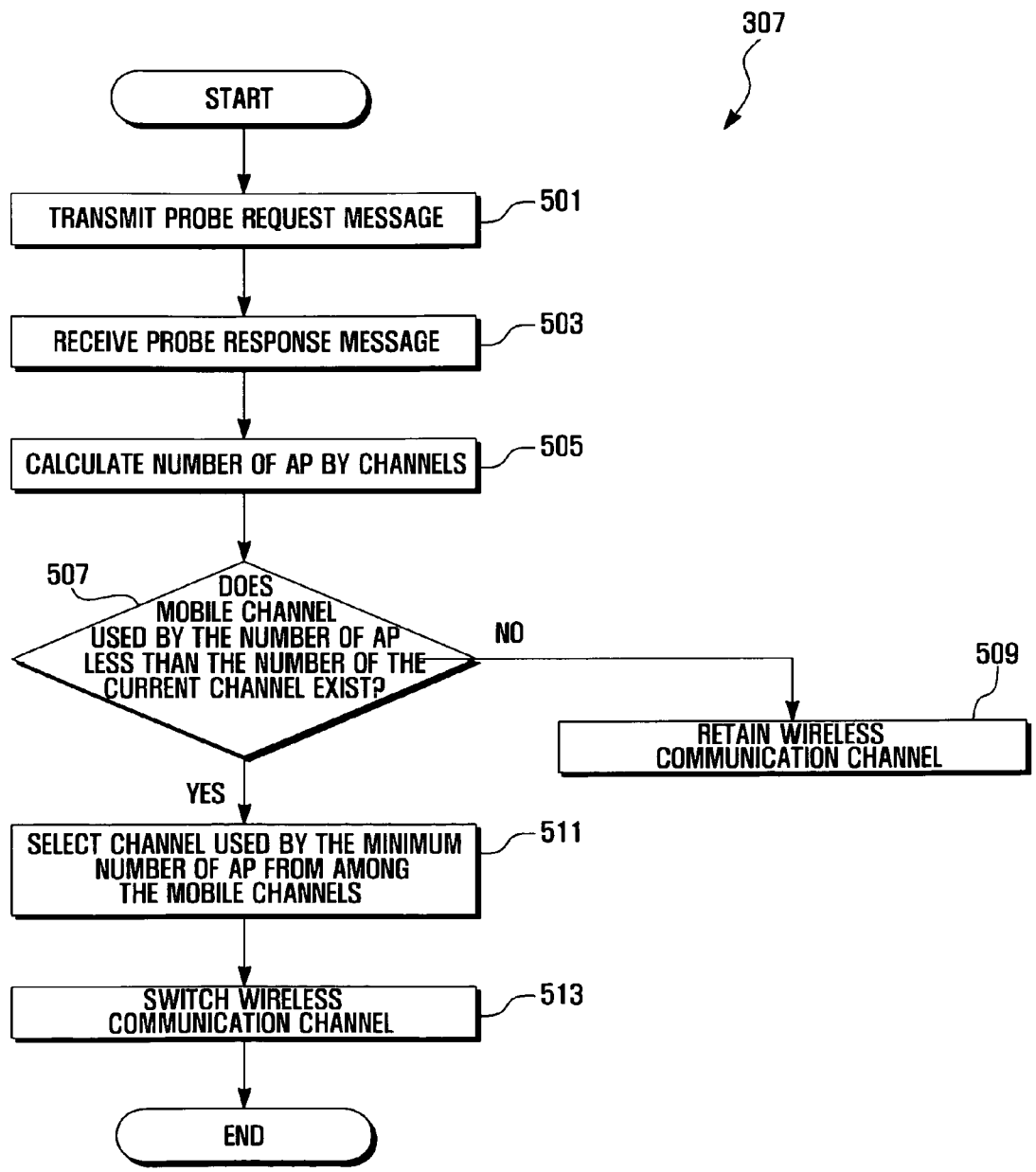
FIG. 5 illustrates a flow chart that describes a method for comparing the numbers of access points by channels according to an embodiment of the present invention.

FIG. 5 illustrates a flow chart that describes a method for comparing the numbers of access points by channels, according to an embodiment of the present invention.

Referring to FIGS. 1 to 5, the controller 110 of the portable terminal 100 transmits a probe request message to a plurality of APs located in a range of communication of the portable terminal 100, via each of a plurality of channels that may be established between the portable terminal 100 and a first AP 10 one of the plurality of APs in block 501. The controller 110 receives probe response messages from the plurality of APs in block 503. The probe response message contains information regarding a service set identifier (SSID) and an IP address of an AP, and so forth.

The controller 110 receives the probe response messages and calculates the number of APs by channels in block 505. That is, the controller 110 transmits a probe request message to the plurality of APs via each of the plurality of channels and receives probe response messages there from for a certain period of time. Through this process, the controller 110 can calculate the number of APs by channels. Thereafter, the controller 110 determines whether there are mobile channels that serve as channels used by APs whose number is less than the number of APs using the particular channel in block 507. If the controller 110 ascertains that there are not mobile channels at 507, the controller 110 retains a wireless communication channel in block 509. Alternatively, if the controller 110 ascertains that there are mobile channels at 507, the controller 110 selects one from among the mobile channels, used by the lease number of APs in block 511.

After that, the controller 110 switches the wireless communication channel to the selected channel in block 513. Although it is not shown in FIG. 5, the controller 110 may switch the wireless communication channel to a channel that is spaced apart from the particular channel with the largest frequency difference if the least number of APs uses two or more channels.

Although it is not shown in FIG. 5, the controller 110 may calculate the summation of the number of APs of channels adjacent to the mobile channels, and switch the wireless communication channel to the mobile channel having the smallest summation. This channel switching operation is performed because of the following reason. That is, if a number of APs use a channel adjacent to the mobile channels used by the least number of APs, the frequency of the adjacent channel causes the congestion in the wireless communication channel established between the portable terminal 100 and the first AP 10.

As described above, the wireless communication channel control method and system, according to the present invention, can continue checking whether wireless communication channels established between the portable terminal and APs is congested and can automatically switch the wireless communication channel to a channel used by a relatively small number of APs, thereby preventing the reduction of communication speed and the disconnection of communication and thus enhancing user convenience.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling wireless communication channels, the method comprising:

establishing a wireless communication channel via a particular channel to an access point (AP), wherein the particular channel is one of a plurality of channels that is capable of being established between a portable terminal and the AP;

determining whether the particular channel is congested;

identifying, when the particular channel is congested, information regarding channels used by a plurality of APs located in a range of communication of the portable terminal;

identifying, for each channel in the plurality of channels, a number of APs using the each channel;

selecting one or more channels in the plurality of channels based on the number of APs identified using the each channel, wherein a number of APs using the one or more channels is less than a number of APs using the particular channel; and when multiple channels are used by a least number of APs, switching the wireless communication channel to a channel in the selected one or more channels that is spaced apart from the particular channel with a largest frequency difference.

2. The method of claim 1, wherein determining whether the particular channel is congested comprises:

measuring a received signal strength indication (RSSI); and determining that the particular channel is congested when the RSSI is equal to or greater than a preset reference value and at least one of a packet error rate (PER) and a retransmission rate (RR) is equal to or greater than a first threshold.

3. The method of claim 2, further comprising:

determining that the particular channel is congested when the RSSI is less than the preset reference value and at least one of the PER and RR is equal to or greater than a second threshold that is set to be greater than the first threshold.

4. The method of claim 2, further comprising:

determining that the particular channel is congested when the RSSI is less than the preset reference value, and a frequency that at least one of the PER and RR is equal to or greater than the first threshold for a certain period is equal to or greater than a preset value.

5. The method of claim 1, wherein identifying the number of APs using the each channel comprises:

transmitting, by the portable terminal, a probe request message to the plurality of APs via each of the plurality of channels;

receiving, by the portable terminal, probe response messages from the plurality of APs; and identifying the probe response messages and calculating, for each channel, the number of APs using the each channel.

6. The method of claim 1, wherein selecting the one or more channels comprises:

identifying a mobile channel having a smallest summation of APs using channels adjacent to the mobile channel from among the plurality of channels.

7. The method of claim 1, further comprising:

when one channel in the selected one or more channels is used by the least number of APs, switching the wireless communication channel to the one channel used by the least number of APs.

8. A system for controlling wireless communication channels, the system comprising:

a plurality of access points (APs); and a portable terminal configured to:

communicate with the plurality of access points (APs), establish a wireless communication channel with a selected AP from among the plurality of APs via a particular channel to the selected AP, wherein the particular channel is one of a plurality of channels that is capable of being established between the portable terminal and the selected AP, identify, for each channel in the plurality of channels, a number of APs using the each channel, and when the wireless communication channel established via the particular channel is congested:

select one or more channels in the plurality of channels having a number of APs using the one or more channels that is less than a number of APs using the particular channel based on the number of APs identified using the each channel, and when multiple channels are used by a least number of APs, switch the wireless communication channel to a channel in the selected one or more channels that is spaced apart from the particular channel with a largest frequency difference.

9. The system of claim 8, wherein the portable terminal comprises:

a wireless local area network (WLAN) communication unit configured to communicate an RF signal with the selected AP; and a controller configured to:

determine whether the particular channel is congested, identify, when the particular channel is congested, information regarding channels used by the plurality of APs located in a range of communication of the WLAN communication unit, select the one or more channels by using the information regarding channels, and switch the wireless communication channel to one of the selected one or more channels.

10. The system of claim 9, wherein the controller comprises:

a wireless local area network (WLAN) module configured to calculate at least one of a packet error rate (PER) and a retransmission rate (RR) of the RF signal.

11. The system of claim 10, wherein the controller is configured to measure a received signal strength indication (RSSI), and determine that the particular channel is congested when the RSSI is equal to or greater than a preset reference value and at least one of the PER and RR is equal to or greater than a first threshold.

12. The system of claim 11, wherein the controller is configured to determine that the particular channel is congested when the RSSI is less than the preset reference value and at least one of the PER and RR is equal to or greater than a second threshold that is set to be greater than the first threshold.

13. The system of claim 11, wherein the controller is configured to determine that the particular channel is congested when the RSSI is less than the preset reference value, and a frequency that at least one of the PER and RR is equal to or greater than the first threshold for a certain period is equal to or greater than a preset value.

14. The system of claim 9, wherein, when the particular channel is congested, the controller is configured to transmit a probe request message to the plurality of APs via each of the plurality of channels, receive probe response messages from the plurality of APs, calculate, for each channel in the plurality of channels a number of APs using the each channel, and identify the one or more channels.

15. The system of claim 9, wherein the controller is configured to identify a mobile channel comprising a smallest summation of APs using channels adjacent to the mobile channel.

16. The system of claim 9, wherein, when one channel in the selected one or more channels is used by the least number of APs, the controller is configured to switch the wireless communication channel to the one channel used by the least number of APs.

17. A portable terminal capable of controlling wireless communication channels, the portable terminal comprising:
  a wireless local area network (WLAN) communication unit configured to communicate with a plurality of access points (AP)s; and
  a controller configured to:
    establish a wireless communication channel with a selected AP from among the plurality of APs via a particular channel to the selected AP, wherein the particular channel is one of a plurality of channels that is capable of being established between the portable terminal and the selected AP,
    identify, for each channel in the plurality of channels, a number of APs using the each channel, and
    when the wireless communication channel established via the particular channel is congested:
      select one or more channels in the plurality of channels having a number of APs using the one or more channels that is less than a number of APs using the particular channel based on the number of APs identified using the each channel, and
      when multiple channels are used by a least number of APs, switch the wireless communication channel to a channel in the selected one or more channels that is spaced apart from the particular channel with a largest frequency difference.

18. The portable terminal of claim 17, wherein the controller is configured to:
  determine whether the particular channel is congested,
  identify, when the particular channel is congested, information regarding channels used by the plurality of APs located in a range of communication of the WLAN communication unit,
  select the one or more channels by using the information regarding channels, and
  switch the wireless communication channel to one of the selected one or more channels.

19. The portable terminal of claim 17, wherein the controller is configured to identify a mobile channel comprising a smallest summation of APs using channels adjacent to the mobile channel.

20. The portable terminal of claim 17, wherein, when one channel in the selected one or more channels is used by the least number of APs, the controller is configured to switch the wireless communication channel to the one channel used by the least number of APs.

* * * * *